US011053432B2

(12) United States Patent
Geary et al.

(10) Patent No.: US 11,053,432 B2
(45) Date of Patent: Jul. 6, 2021

(54) ULTRA HIGH STRENGTH PROPPANT AND METHOD OF PREPARING THE SAME

(71) Applicant: First Bauxite LLC, Denver, CO (US)

(72) Inventors: Bryan Geary, New Orleans, LA (US); Carl Sorrell, New Orleans, LA (US); Howard Winkelbauer, Munhall, PA (US); Craig Searchfield, Miami, FL (US)

(73) Assignee: First Bauxite LLC, Denver, CO (US)

( * ) Notice: Subject to any disclaimer, the term of this patent is extended or adjusted under 35 U.S.C. 154(b) by 0 days.

(21) Appl. No.: 16/047,998

(22) Filed: Jul. 27, 2018

(65) Prior Publication Data

US 2019/0048253 A1 Feb. 14, 2019

Related U.S. Application Data

(60) Provisional application No. 62/543,254, filed on Aug. 9, 2017.

(51) Int. Cl.
*C09K 8/80* (2006.01)
*C04B 35/10* (2006.01)
*C04B 35/18* (2006.01)
*E21B 43/267* (2006.01)

(52) U.S. Cl.
CPC ............... *C09K 8/80* (2013.01); *C04B 35/10* (2013.01); *C04B 35/18* (2013.01); *E21B 43/267* (2013.01)

(58) Field of Classification Search
CPC ....... C04B 35/10; C04B 35/111; C04B 35/18; C09K 8/80
See application file for complete search history.

(56) References Cited

U.S. PATENT DOCUMENTS

| 3,784,388 | A | * | 1/1974 | King | C04B 35/111 501/128 |
|---|---|---|---|---|---|
| 4,879,181 | A | | 11/1989 | Fitzgibbon | |
| 5,120,455 | A | | 6/1992 | Lunghofer | |
| 5,188,175 | A | | 2/1993 | Sweet | |
| 6,780,804 | B2 | | 8/2004 | Webber | |
| 7,036,591 | B2 | | 5/2006 | Cannan | |
| 7,067,445 | B2 | | 6/2006 | Webber | |
| 7,615,172 | B2 | | 11/2009 | Palamara | |
| 7,825,053 | B2 | | 11/2010 | Duenckel | |
| 7,828,998 | B2 | | 11/2010 | Luscher et al. | |
| 7,976,949 | B2 | | 7/2011 | Dickson | |
| 8,063,000 | B2 | | 11/2011 | Wilson | |
| 8,216,675 | B2 | | 7/2012 | Palamara | |
| 8,772,207 | B2 | * | 7/2014 | Geary | C09K 8/80 507/269 |
| 9,631,137 | B2 | | 4/2017 | Fuss | |

(Continued)

FOREIGN PATENT DOCUMENTS

CN 001393424 A 1/2003
CN 102731073 A * 10/2012

(Continued)

OTHER PUBLICATIONS

Shelley, R.F., How to get the most out of your multi-stage unconventional fracture design, White Paper, 2016.

(Continued)

*Primary Examiner* — Karl E Group

(57) ABSTRACT

A proppant having a high alumina content, low iron content and low alkali content may be prepared from a raw bauxite ore containing greater than 60 wt. % tri-hydrate alumina. The proppant may further be prepared from calcined bauxite having greater than 80 wt. % tri-hydrate alumina.

12 Claims, 5 Drawing Sheets

(56) References Cited

U.S. PATENT DOCUMENTS

| | | | |
|---|---|---|---|
| 2006/0081371 A1* | 4/2006 | Duenckel | C04B 35/62695 166/280.2 |
| 2007/0023187 A1 | 2/2007 | Canova | |
| 2008/0053657 A1* | 3/2008 | Alary | C04B 35/111 166/280.2 |
| 2010/0087341 A1* | 4/2010 | Alary | C04B 35/111 507/271 |
| 2011/0160104 A1 | 6/2011 | Wu | |
| 2016/0115375 A1* | 4/2016 | Loricourt | C09K 8/80 428/397 |
| 2016/0264854 A1* | 9/2016 | Alary | C04B 35/111 |
| 2017/0335177 A1 | 11/2017 | Bottiglieri | |
| 2018/0171214 A1 | 6/2018 | Petit | |

FOREIGN PATENT DOCUMENTS

| | | | |
|---|---|---|---|
| CN | 102660252 B | | 1/2014 |
| CN | 105567214 A | | 5/2016 |
| CN | 106830904 | | 6/2017 |
| CN | 106830904 A | | 6/2017 |
| CN | 107699225 A | * | 2/2018 |
| CN | 108315007 A | * | 7/2018 |

OTHER PUBLICATIONS

Investor Presentation, Performance Driven Technology, Mar. 2017.
Deep Gas Utica Well Utilizes Carbo Kryptosphere LD Technology, News Release, Feb. 2, 2016.
Kullman, J., The Complicated World of Proppant Selection . . . , South Dakota School of Mines & Technology, Oct. 2011.
Conkle, Don P., et al., WorldOil Live Webcast, Hydraulic Fracturing Forum: 2016, Jun. 9, 2016,.
Technical Data Sheet: Kryptosphere HD, Ultra-conductive, high-density ceramic proppant, 2015.
capital One Securities 11th Annual Energy Conference, Dec. 7, 2016, Performance Driven Technology, 2016.
International Search Report, PCT/US2018/044213, dated Dec. 14, 2018.
First Bauxite Corporate Presentation, Jan. 2017.
Hartleys Limited, DBO Bauxite Opportunities in Cameroon, Feb. 10, 2014.
NI 43-101 Technical Report Feasibility Study for the Bonasika Proppant Project, Guyana, First Bauxite Corporation, Aug. 4, 2015.
News Release: First Bauxite Corporation Announces Proppant Feasibility Study Results, Jun. 18, 2015.
J. Zhao, et al. Preparation and characterization of low-density mullite-based ceramic proppant by a dynamic sintering method, Materials Letters 152 (2015) 72-75.
Kryptosphere HD®, Ultra-conductive, high-density ceramic proppant, Technology Profile, CARBO Ceramics Inc., 2017.
Kryptosphere LD®, Ultra-conductive, low-density ceramic proppant, Technology Profile, CARBO Ceramics Inc., 2017.
International Preliminary Examination Report on Patentability of corresponding PCT/US2018/044213 dated Jun. 5, 2020.

* cited by examiner

ULTRA HIGH STRENGTH PROPPANT AND METHOD OF PREPARING THE SAME

This application claims the benefit of U.S. patent application Ser. No. 62/543,254, filed on Aug. 9, 2017, herein incorporated by reference.

FIELD OF THE DISCLOSURE

The disclosure relates to an ultra-high strength proppant for use in the hydraulic fracturing of a subterranean formation penetrated by a well. The disclosure also relates to a process for preparing the ultra-high strength proppant.

BACKGROUND OF THE DISCLOSURE

Oil and natural gas are produced from wells having porous and permeable subterranean formations. The porosity of the formation enables the storage of oil and gas; the permeability of the formation enables the oil or gas to flow through the formation.

Hydraulic fracturing is a common stimulation technique for improving well productivity wherein conductive flow paths are created from the wellbore to the formation by the injection of fracturing fluid into the wellbore. Because fractured well productivity depends on the ability of a fracture to conduct fluids from a formation to a wellbore, fracture conductivity is an important parameter in determining the degree of success of a hydraulic fracturing treatment.

Typically, particulate solids or proppants are suspended in the fracturing fluid. The proppants prevent the fractures from closing after hydraulic pressure is removed.

Spherical particles of uniform size are generally acknowledged to be the most effective proppants due to maximized permeability. For this reason, assuming other properties to be equal, spherical or essentially spherical proppants are used, such as rounded grains or beads.

One of the earlier materials used as proppant was sand. However, in stimulation operations of deep wells (often having depths from 15,000 to 30,000 feet) as well in the stimulation of hard formations, such as shale and limestone, sand is typically ineffective as proppant. The compressive forces in such locales requires alternative materials which exhibit higher crush resistance than sand.

A higher strength proppant is produced from bauxite. The typical form of bauxite consists essentially of aluminum oxide hydroxide, i.e., boehmite which is dimorphous with diaspore. Proppant products initially produced from bauxite contained high levels of iron and silica. However, in deepwater wells with compressive forces of up to 20,000 psi and temperatures of up to 450° F., stronger more resilient bauxite based proppants are needed which exhibit improved compressive strength and sphericity and which enhance the permeability of the formation and conductive flow channels of created fractures. Consequently, this has led to the development of new ultra high strength bauxite based proppants in recent years.

The above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment herein, a proppant is disclosed which is sintered from a mixture comprising (a) between from about 80 to about 99 wt. % of a raw bauxite having an alumina tri-hydrate content greater than 59 wt. %; (b) between 0 and about 10 wt. percent manganese powder; and (c) between 0 and about 10 wt. percent milled raw dolomite.

In another embodiment herein, a proppant is disclosed which is sintered from a mixture comprising (a) bauxite calcined from bauxite having an alumina tri-hydrate content greater than 59 wt. %, the calcined bauxite having an aluminum oxide content greater than 80 wt. %; (b) between from about 0 to about 10 wt. manganese powder; and (c) between from about 0 to about 10 wt. percent milled raw dolomite.

In another embodiment, a proppant having a high aluminum oxide content is disclosed of a mixture comprising (a) between 0 to about 50 wt. percent of raw bauxite having an alumina tri-hydrate content greater than 59 wt. %; (b) between from about 50 to 90 wt. percent of calcined bauxite having an aluminum oxide content greater than 80 wt. %, the calcined bauxite produced by calcining raw bauxite having an alumina tri-hydrate content greater than 59 wt. %; (c) between 0 and about 10 wt. percent manganese powder; and (d) between 0 and about 10 wt. percent milled raw dolomite. The amount of aluminum oxide in the proppant is typically greater than 80 wt. %, more typically greater than 89 wt. %. The raw bauxite may be calcined.

In another embodiment of the disclosure, a proppant having an alumina tri-hydrate content more than 80 wt. % is provided. The proppant may be prepared by calcining raw bauxite having an alumina tri-hydrate content more than 60 wt. %; subjecting the calcined bauxite to milling to obtain a powder and then blending manganese and dolomite with the powder. Typically, the blend contains from about 80 to about 99 wt. percent of calcined bauxite having an alumina tri-hydrate content greater than 80 wt. %; between 0 and about 10 wt. percent manganese powder; and between 0 and about 10 wt. percent milled raw dolomite. Spheres are then formed and the spheres are then sintered.

In another embodiment, a proppant having a high aluminum oxide content is disclosed which is sintered from a mixture comprising between from about 80 to about 99 wt. percent of bauxite having an aluminum oxide content greater than 80 wt. %, the bauxite produced by calcining raw bauxite having an alumina-trihydrate content greater than 59 wt. %; (c) between 0 and 10 wt. percent manganese powder; and (d) between 0 and about 10 wt. percent milled raw dolomite. The amount of aluminum oxide in the proppant is typically greater than 80 wt. %, more typically greater than 89 wt. %.

In another embodiment, a proppant is prepared from raw bauxite and calcined bauxite. The bauxite is fully calcined (or partially calcined) prior to mixing it with the raw bauxite. A fully calcined bauxite typically contains between from about 80 to about 90 weight percent of aluminum oxide. The mixture of calcined bauxite and raw bauxite is then micronized or ground to form a powder mixture. The powder is then blended with manganese powder and milled raw dolomite. Typically, the blend contains between 0 and about 50 wt. percent of raw bauxite having an alumina tri-hydrate content greater than 59 wt. %; between from about 50 to about 90 wt. percent of calcined bauxite having an aluminum oxide content greater than 80 wt. %; between 0 and about 10 wt. percent manganese powder; and between 0 and about 10 wt. percent milled raw dolomite. In an embodiment, the amount of aluminum oxide in the proppant is greater than 80 wt. %, more typically greater than 89 wt. %. After the addition of manganese and dolomite, spheres may be formed. The spheres may then be dried to remove water to form dried spheres which may then be screened and sintered. Alternatively, the spheres may be sintered without drying and then screened. In an embodiment, the bauxite ore subjected to calcination and the raw bauxite are the same.

In another embodiment, a proppant is prepared by first calcining bauxite having an alumina tri-hydrate content greater than 59 wt. %. The calcined bauxite is the milled to a particle size between from about minus 180 mesh to about minus 425 mesh. The product is then mixed with manganese and dolomite to form a powder mixture. Spheres are then formed from the powder mixture. The spheres are then sintered at a temperature between from about 1200° C. to about 1600° C. The sintered spheres are then screened.

In another embodiment of the disclosure, a process of making a proppant having alumina tri-hydrate content in excess of 80 wt. % is provided. In this embodiment, a first raw bauxite having an alumina content greater than about 60 weight percent is calcined. The calcined bauxite is then mixed with a second raw bauxite having an alumina content greater than about 60 weight percent. In an embodiment, the amount of calcined bauxite in the mixture of calcined bauxite and second raw bauxite are between from about 80 to about 90 weight percent. The mixture of calcined bauxite and raw bauxite is then micronized or ground to form a powder mixture. A manganese powder and dolomite are then added to the powder mixture. The spheres may then be dried to remove water to form dried spheres, or alternately they may be sintered without drying. The dried spheres may then be screened and sintered to form sintered proppant.

In another embodiment, a proppant may be prepared by first milling raw bauxite having an alumina tri-hydrate content greater than 59 wt. % to a particle size between from about minus 180 mesh to about minus 425 mesh. The product is then mixed with manganese and dolomite to form a powder mixture. The amount of the raw bauxite in the powder mixture is between from about 80 to about 90 weight percent. Spheres are then formed from the powder mixture. The spheres are then sintered at a temperature between from about 1200° C. to about 1600° C. The sintered spheres are then screened.

In another embodiment, a process of preparing a proppant is provided wherein a raw bauxite having an alumina tri-hydrate content greater than 59 wt. % is first milled to a particle size between from about minus 180 mesh to about minus 425 mesh. The product is then mixed with manganese and dolomite to form a powder mixture. The amount of the raw bauxite in the powder mixture is between from about 80 to about 90 weight percent. Spheres are then formed spheres from the powder mixture. The spheres are then sintered to a temperature between from about 1200° C. to about 1600° C. The sintered spheres are then screened.

In another embodiment, a process of preparing a proppant is provided wherein bauxite having an alumina tri-hydrate content greater than 59 wt. % is first calcined. The calcined bauxite is then milled to a particle size between from about minus 180 mesh to about minus 425 mesh. The product is then mixed with manganese and dolomite to form a powder mixture. Spheres are then formed from the mixture. The spheres are then sintered at a temperature between from about 1200° C. to about 1600° C. The sintered spheres are then screened.

In yet another embodiment, a process of making a proppant is disclosed wherein a raw bauxite having an alumina trihydrate content greater than 60 weight percent is first calcined. The calcined bauxite is then mixed with a second raw bauxite having an alumina content greater than about 60 weight percent. The amount of calcined bauxite in the mixture of calcined bauxite and second raw bauxite is between from about 80 to about 90 weight percent. The mixture is then milled to form a powder. Flux components are then added to the powder mixture and spheres are formed; the spheres comprising the flux, the raw bauxite and the calcined bauxite. The flux comprises manganese powder and dolomite. Water may be removed from the spheres to form dried spheres and the dried spheres screened and sintered. The sintered spheres may then be polished. As an alternative, the spheres may be screened, and the screened spheres then dried and sintered to form a sintered proppant spheres. The sintered proppant spheres may then be optionally polished.

BRIEF DESCRIPTION OF THE DRAWINGS

The following figures are part of the present specification, included to demonstrate certain aspects of various embodiments of this disclosure and referenced in the detailed description herein.

DETAILED DESCRIPTION OF THE PREFERRED EMBODIMENTS

Figure 1:
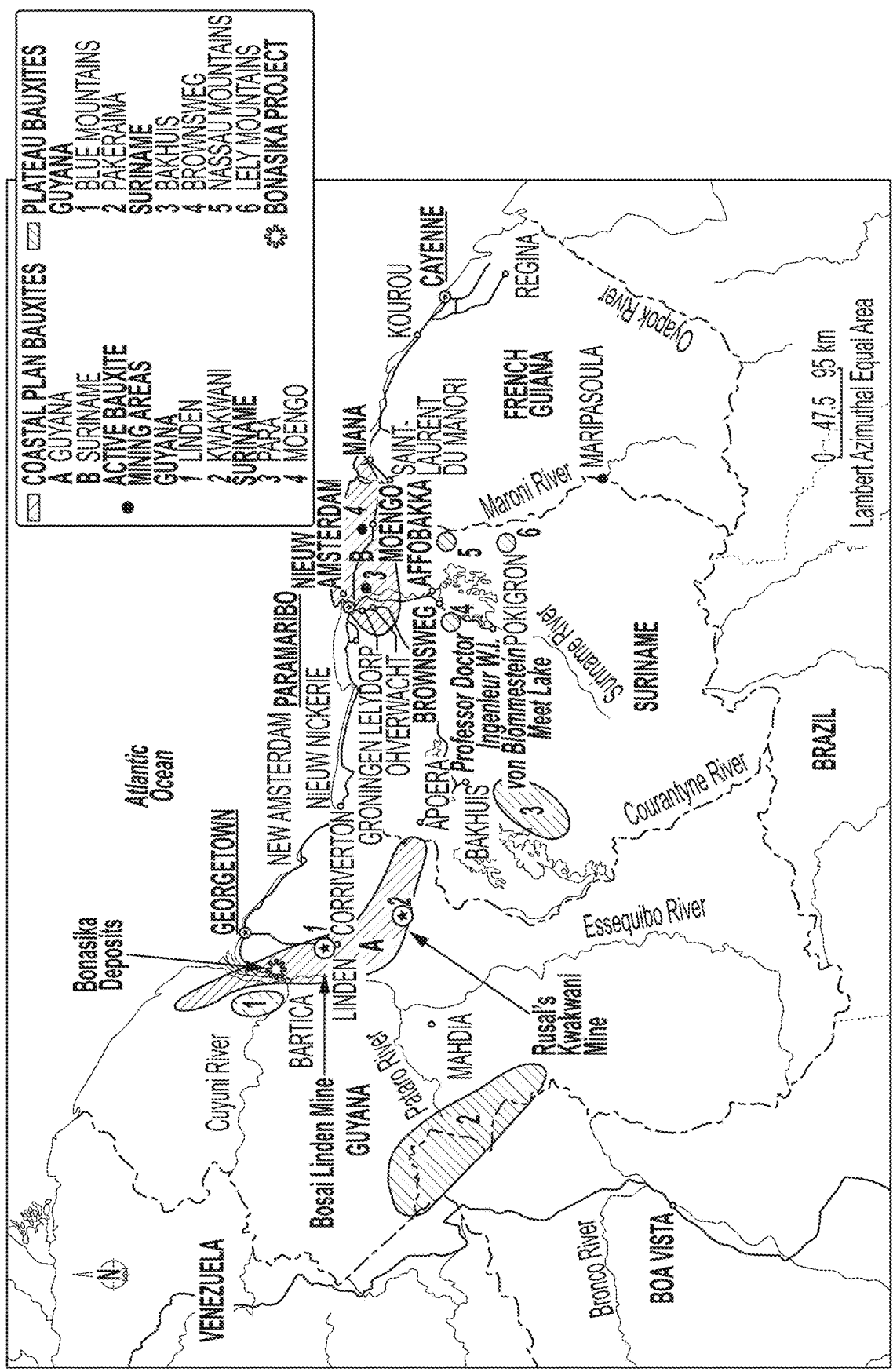
FIGS. 1, 2 and 3 are maps showing the bauxite regions identified as Bonasika deposits as disclosed herein.

Characteristics and advantages of the present disclosure and additional features and benefits will be readily apparent to those skilled in the art upon consideration of the following detailed description of exemplary embodiments of the present disclosure and referring to the accompanying figures. The description herein and appended drawings, being of example embodiments, are not intended to limit the claims of this patent or any patent or patent application claiming priority hereto. On the contrary, the intention is to cover all modifications, equivalents and alternatives falling within the spirit and scope of the claims. Many changes may be made to the embodiments and details disclosed herein without departing from such spirit and scope.

Certain terms are used herein and in the appended claims to refer to particular components. As one skilled in the art will appreciate, different persons may refer to a component by different names. This document does not intend to distinguish between components that differ in name but not function. Also, the terms "including" and "comprising" are used herein and in the appended claims in an open-ended fashion, and thus should be interpreted to mean "including, but not limited to . . . ." Further, reference herein and in the appended claims to components and aspects in a singular tense does not necessarily limit the present disclosure or appended claims to only one such component or aspect, but should be interpreted generally to mean one or more, as may be suitable and desirable in each instance.

All percentages referenced herein refer to weight percentages unless stated to the contrary.

The proppant disclosed herein is an engineered bauxite ceramic sintered from a mixture containing a binder, raw bauxite manganese and dolomite.

The raw bauxite may be referred to herein as "direct feed bauxite" or "DFB". The raw bauxite has an alumina trihydrate content greater than 59%. The raw bauxite may be calcined. The calcined bauxite is prepared by calcining the raw product. The ceramic may further be prepared from a mixture of raw bauxite having an alumina trihydrate content greater than 59% and a calcined bauxite (bauxite calcined from raw bauxite having an alumina trihydrate content greater than 59 wt. %). The raw bauxite calcined to form the calcined bauxite may be same bauxite as the raw bauxite (or prepared from the same source as the raw bauxite ore).

Typically, the calcined bauxite referenced herein has an aluminum oxide content from about 80 to about 90 percent.

The aluminum oxide content of the engineered bauxite ceramic is greater than 80 wt. %.

In an embodiment, the powder contains between from about 10 to about 50 wt. % raw bauxite having an alumina tri-hydrate content greater than 59 wt. % and between from about 50 to about 90, more typically between from about 80 to about 90, wt. percent of calcined bauxite having an aluminum oxide content greater than 80 wt. %. In an embodiment, the calcined bauxite is the product resulting from calcination of the raw bauxite. In this embodiment, the bauxite subjected to milling is a mixture of raw bauxite and the calcined product of the same raw bauxite.

When used in deepwater treatment operations of oil and gas wells, such as a hydraulic fracturing operation, the proppant improves estimated ultimate recovery (EUR) of hydrocarbons.

In addition to being prepared from the raw bauxite, calcined bauxite or mixture of raw bauxite and calcined bauxite, the proppant is prepared from manganese oxide and dolomite.

In an embodiment, the raw bauxite or calcined bauxite is micronized or ground to form a powder. When the ceramic is derived from both raw bauxite and calcined bauxite, the raw bauxite and calcined bauxite are micronized to ground to form a powder mixture.

The manganese powder and dolomite is then added to the powder (mixture) to provide spheres. Typically, the powder or powder mixture contains between 0 and about 12 wt. %, preferably from about 2 to about 10 wt. %, more preferably between from about 4 and about 8 wt. % manganese and from about 1 to about 4 wt. % dolomite.

In an embodiment, the powder (mixture) contains between from about 80 to about 99 wt. % of bauxite which is either raw bauxite containing greater than about 59 wt. % alumina tri-hydrate or calcined bauxite having an aluminum oxide content greater than 80 wt. % or a mixture thereof.

A binder may optionally be added to the powder (mixture). The spheres may then be dried to remove water to form dried spheres. The dried spheres may then be screened and sintered to form sintered proppant. Alternatively, the spheres may be sintered without drying and then screened.

The form of alumina in the raw bauxite is principally gibbsite, the tri-hydrate, $Al(OH)_3$, form of alumina. The raw bauxite contains no more than 3-6 wt. % of the boehmite, diaspore or monohydrate, $AlO(OH)$, form of alumina. The raw bauxite is further characterized by low amounts of silica, iron, and alkali.

Typically, the raw bauxite has an alumina tri-hydrate content between 59 and 63 percent. Typically, the raw bauxite contains more than 60% alumina.

An exemplary raw bauxite may contain from about 60 to about 63% alumina, from about 2.5 to about 5.5% silica, from about 0.4 to about 1.5% iron oxide, from about 1.5 to about 4.5% titania, less than 0.5% alkalis, the balance being water.

In a preferred embodiment, the raw bauxite is extracted bauxite obtained from mines in Guyana, known as the Bonasika deposits, which has been calcined. Bonasika bauxite is principally gibbsite.

Bonasika bauxite deposits are located within a 25-30 km wide arcuate belt on the northern flank of the Guiana Shield within a region commonly referred to as the Coastal Plains. They form a cluster known as the Essequibo Group in the northerly part of the Coastal Plain Bauxite Belt between the Demerara and Essequibo rivers, to the east and west respectively. In this region, the bauxites are exposed at the surface as well as at depths of 60 m.

Figure 2:
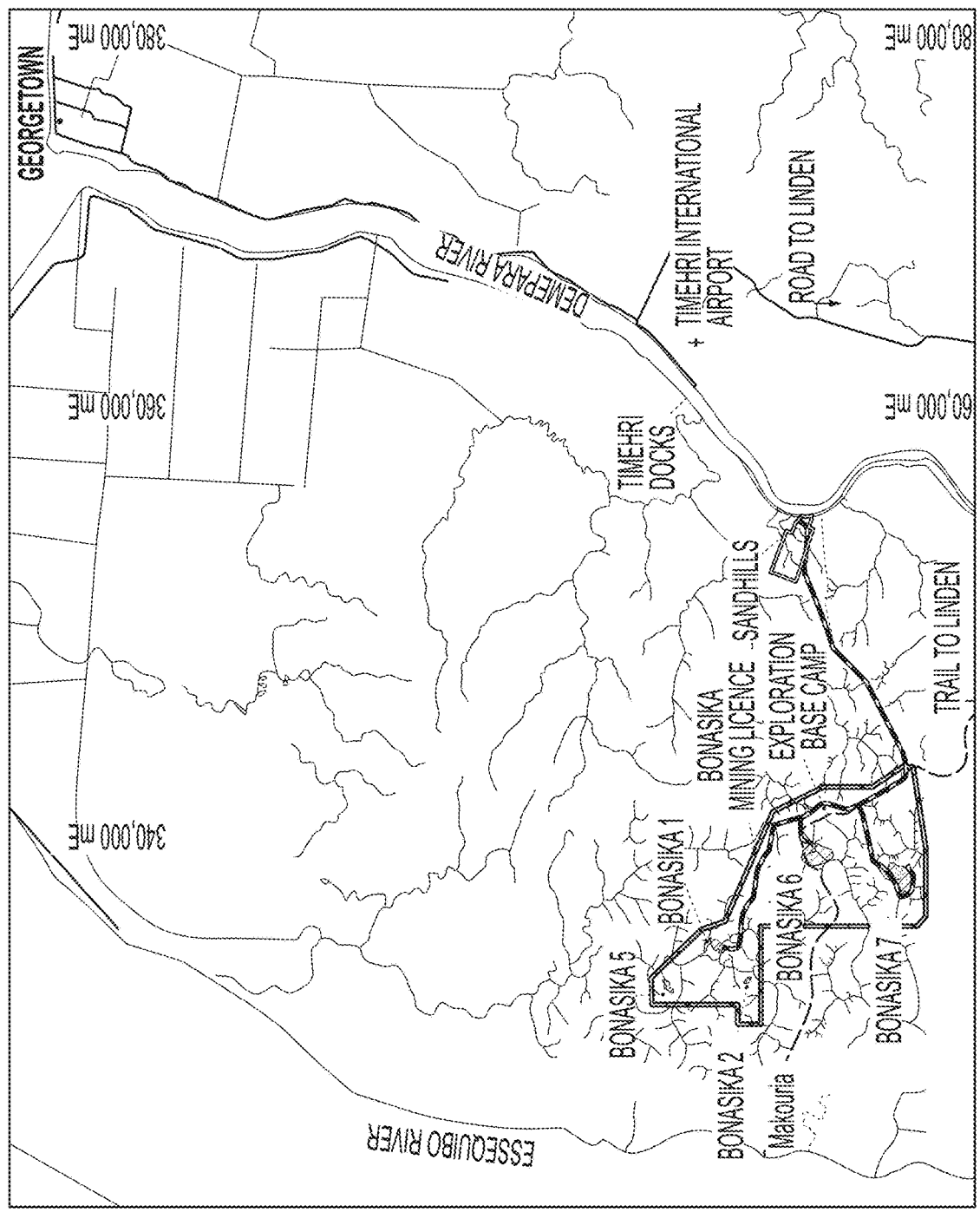
Figure 3:
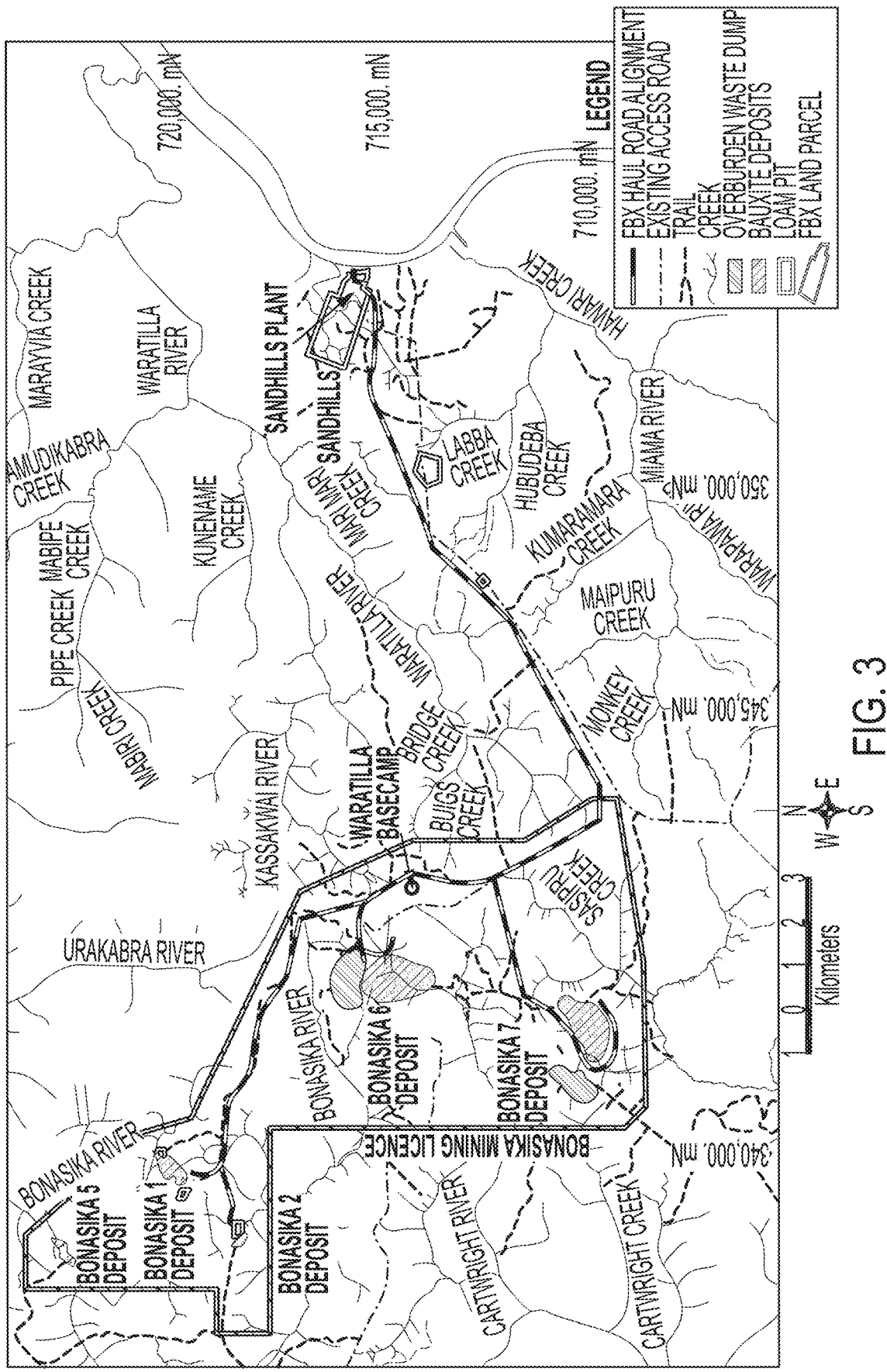

The bauxite regions of Bonasika 6 and 7 are illustrated in FIGS. 1, 2 and 3. The mineralized horizon for the Bonasika 7 deposit covers an area 1,600 m by 1,100 m and is essentially flat and largely continuous, with the exception of local clay seams. Bonasika 7 deposit ore zone is 4.2 m thick and has an average overburden cover of 28.7 m. The Bonasika 7 deposit outcrops at the south west corner of the deposit but the overburden thickens toward the east to a maximum thickness of 42 m.

The Bonasika 6 deposit extends some 1,600 m (north-south) and 700 m (east-west). The deposit is essentially flat although variable depths of overburden cover the deposit ranging from 20 m to 60 m. The average depth of overburden is 40 m. The average thickness of the bauxite intercepts is 4.1 m with the maximum attaining 9.24 m.

In a preferred embodiment, the raw bauxite is bauxite extracted after the removal of overburden.

Typically, the raw bauxite disclosed herein contains from about 15 to about 18 percent free water.

The raw bauxite may be calcined to remove the free and chemical containing water. Typically, the raw bauxite is calcined to a temperature of from about 600° C. to about 1200° C. The resulting product is the calcined bauxite referenced herein.

Since the raw bauxite is a tri-hydrate, a greater percentage of weight is lost during calcining than what would have been lost had the bauxite been in a mono-hydrate form. Thus, a higher concentration of solids is in the calcined bauxite than would be evident had the raw bauxite been a monohydrate alumina. It is important therefore that the amount of undesirable components, such as silica, iron and alkalis, be very low in the raw bauxite. Otherwise, such deleterious components would be present at a less than desirable concentration in the calcined (tri-hydrate) bauxite. The very low amount of silica, iron and alkalis in the raw bauxite referenced herein enables production of a sintered bauxite having desirable qualities.

In a preferred embodiment, the ultra high strength proppant may be prepared by first micronizing a mixture of raw bauxite with bauxite calcined from raw bauxite. While the bauxite of the calcined bauxite and the raw bauxite may come from different deposits (sources), in a preferred embodiment the bauxite of the calcined bauxite and the raw bauxite are from the same deposit.

Typically, micronization of the raw bauxite, calcined bauxite or mixture of raw bauxite and calcined bauxite occurs in a conventional grinder to form the powder mixture. Typically, the particle size of the raw bauxite, calcined bauxite or mixture of raw bauxite and calcined bauxite after micronization is about −180 to about −400 mesh, typically about −325 mesh.

The raw bauxite, calcined bauxite or mixture of raw bauxite and calcined bauxite may then be blended with a flux in a mixer to form spheres. The flux is a mixture of manganese oxide and dolomite, $CaMg(CO_3)_2$. The manganese may be MnO, $MnO_2$, $Mn_3O_4$ or a manganese salt.

The flux promotes the use of lower temperatures during sintering. The manganese promotes lower temperature sintering of bauxite to corundum. The combination of these two fluxing agents results in superior crystal formation of corundum ($\alpha$-$Al_2O_3$) enhancing the strength of the sintered proppant, with a minimal formation of glass at a reduced firing temperature. Minimal glass formation is desired to minimize the shattering of glass into fine shards which negatively affects the conductivity and permeability of the proppant when subjected to crushing at high stress levels. Alternately, other fluxes known in the art may be used such as feldspar, and nepheline syenite.

A typical mixture subjected to sintering may contain the raw bauxite (raw, calcined or a mixture thereof) manganese in an amount between 0% to about 12%, preferably between from about 2% to about 10%, more preferably between from about 4% to about 8%, the remainder being dolomite.

An exemplary mixture subjected to sintering may be that set forth in Table I:

TABLE I

| Component | Wt. Percent |
| --- | --- |
| Calcined DFB | 80%-90% |
| Raw DFB | 5%-10% |
| Manganese Dioxide Powder | 4%-10% |
| Milled Raw Dolomite | 1%-4% |
| Binder | 0-10%** |

**Depending on binder and granulation method

The binder, when used, is compatible with the raw bauxite or ceramic bauxite. Exemplary binders may include polyvinyl alcohol, lignin sulphonate, corn starch, wheat starch as well as other binders typically used in the industry such as bentonite or other plastic clay and clay-like materials. Alternative, the nature of the powder or powder mixture may not require any binder to be used in processing. The binder may be added to the mixture dry or in solution.

Further treatment does not require wet processing but rather a dry process wherein the batch is first mixed with an effective amount of water to form green proppant beads. Preferably mixing occurs in a high intensity counter-flow mixer, such as an Eirich type mixer. However, a lower intensity mixer such as a drum, pan or airplane tire granulator may also be used.

The green beads (spheres) are then dried to remove free water. Typically, the spheres may be dried in a rotary dryer.

Sintered proppant spheres may be obtained in one of two processes. In the first process, the green beads are first dried to remove water. The screened spheres are then sintered to form the proppant.

In an alternative process, the spheres are first screened and then dried. Typically, the spheres are dried at a temperature between from about 300° C. to about 600° C. The screened dried spheres are then sintered to form proppant.

The beads are sintered at a temperature between from about 1200° C. to about 1650° C. Typically, the beads are sintered at a temperature greater than 1300° C., typically from about 1425° C. to about 1475° C. The hold time at peak temperature may be about 20 minutes or up to one hour. Sintering may be conducted in a rotary kiln, tunnel kiln, period kiln, shuttle kiln, etc. where the product is contained in a saggar. Temperature ramp rate and hold time is dependent on method of sintering and the size of the sintering furnace.

After sintering, the proppant may be screened and then re-screened to a desirable size, such as 16/30 mesh, 16/70 mesh, 20/40 mesh, 30/60 mesh, 40/80 mesh, etc. The dried spheres are then screened to the desired size range.

The sintered proppant may further be agitated to remove surface imperfections.

The proppant may further, after sintering, be polished by mechanical or chemical methods.

The sintered proppant may be characterized by low iron levels (typically less than 1.5 wt. percent iron oxide and more typically less than about 1%), low alkali and alkaline earth oxides (typically less than 0.5 wt. %) and an alumina content more than 80 percent wt. percent, more typically between from about 85 to about 95 weight percent, most typically more than 89 wt. percent.

Crush resistance, API RP 56, of the proppant has been noted to produce less than 3.5% fines at 15,000 psi, less than 7% fines at 20,000 psi and less than 10.5% fines at 30,000 psi.

EXAMPLES

Raw bauxite ores were extracted from Bonasika 6 and Bonasika 7 and determined to be composed of the materials (in wt. %) set forth in Table II:

TABLE II

| Sample | Raw Ore, '000 t | $Al_2O_3$ (tri-hydrate) | $SiO_2$ | $Fe_2O_3$ | $TiO_2$ | Alkali | LOI |
| --- | --- | --- | --- | --- | --- | --- | --- |
| A - Bon. 6 | 2,037 | 61.21 | 4.36 | 0.85 | 2.35 | | 30.7 |
| B - Bon. 7 | 1,874 | 60.2 | 4.58 | 0.75 | 2.63 | | 30.9 |
| C - Bon. 7 | | 60.98 | 3.8 | 0.5 | 2.7 | <0.02 | 32 |
| D - Bon. 7 | | 61.4 | 4.0 | 0.42 | 2.94 | | 31.24 |
| E - Bon. 7 | | 61.41 | 4.04 | 0.42 | 2.97 | 0.57 | 30.9 |

Sample E was then calcined at 950° C. for 60 minutes. The raw bauxite was then combined with the calcined bauxite and milled. The weight percentages of raw bauxite and calcined bauxite in the milled powder are set forth in Table III:

TABLE III

| | Raw Bauxite | Calcined Bauxite |
| --- | --- | --- |
| $SiO_2$ | 4.04% | 5.74% |
| $Al_2O_3$ | 61.41 | 88.92 |
| $TiO_2$ | 2.97 | 4.29 |
| $Fe_2O_3$ | 0.42 | 0.64 |
| CaO | <0.13 | <0.13 |
| MgO | <0.16 | <0.16 |
| $Na_2O$ | <0.04 | <0.04 |
| $K_2O$ | <0.13 | <0.13 |
| $P_2O_5$ | 0.11 | 0.15 |
| MnO | <0.03 | <0.03 |
| LOI | 30.90 | 0.24 |
| Total | 100.00 | 100.00 |

A mixture was prepared containing 6 wt. % of the raw bauxite and 88.5 wt. % of the calcined bauxite of Table III with 4 wt. % manganese dioxide and 1.5 wt. % dolomite plus an effective amount of a binder solution of up to 10 wt. %. The powder mixture was then micronized in a ball mill to form spheres. The spheres were then dried to remove water and screen to 16/70 mesh. The spheres were then sintered at a temperature of about 1460° C. for about 20 minutes. The proppant was then sized to 16/30 mesh. The proppant was analyzed and found to contain the components as set forth in Table IV:

TABLE IV

| Component | Wt. % |
|---|---|
| Al$_2$O$_3$ | 86.77 |
| SiO$_2$ | 4.41 |
| iO$_2$ | 2.45 |
| Fe$_2$O$_3$ | 1.13 |
| CaO | 0.57 |
| MgO | 0.33 |
| P$_2$O$_5$ | 0.15 |
| Cr$_2$O$_3$ | 0.06 |
| K$_2$O | < 0.13 |
| Na$_2$O | < 0.04 |
| LOI | 0.05 |

The proppant of Table IV was characterized by the following properties:
Sieve distribution:

| | +20 mesh | −22 + 25 mesh | −30 + 35 mesh | −25 + 30 mesh | −30 + 40 mesh | −40 + 50 mesh | Median diameter, nm | Mean diameter, nm |
|---|---|---|---|---|---|---|---|---|
| 20/40 | 2.0 | 47.4 | 37.1 | 9.5 | 3.8 | 0.1 | 0.692 | 0.704 |

Crush resistance: API RP 56, % fines:

| | Closure stress, psi | | | |
|---|---|---|---|---|
| | 12,500 | 15,000 | 20,000 | 30,000 |
| 20/40 | 1.85% | 3.06% | 6.58% | 10.0% |

Mesh distribution, U.S. standard: −20/40
Sphericity: 0.9
Bulk density: 2.05 g/cc;
Absolute volume: 0.0363 gal/lb;
Apparent density: 3.30 g/cc;
Apparent specific gravity: 3.65

Figure 4:
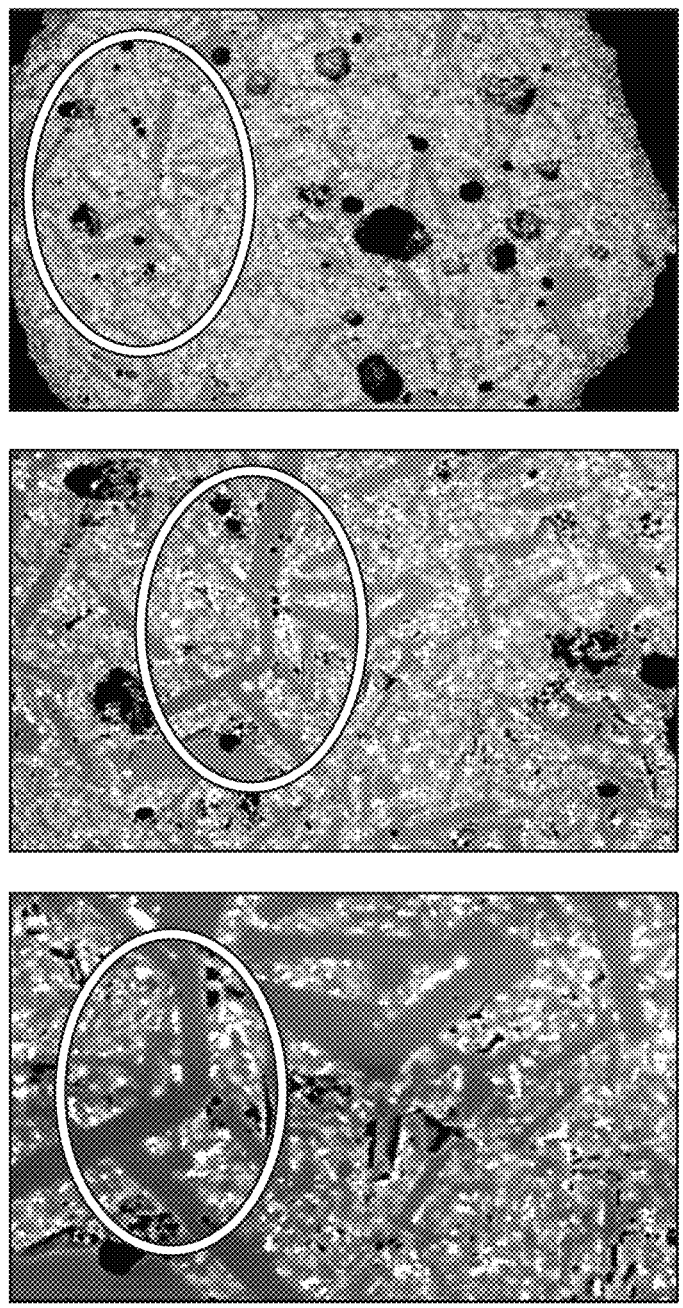
FIG. 4 is a series of SEM images depicting microstructures of the sintered proppant of Example 1 showing reinforcing rods.

The microstructure of the sintered proppant is illustrated in FIG. 4 (at 250×, 500× and 1,000×, respectively).

Figure 5:
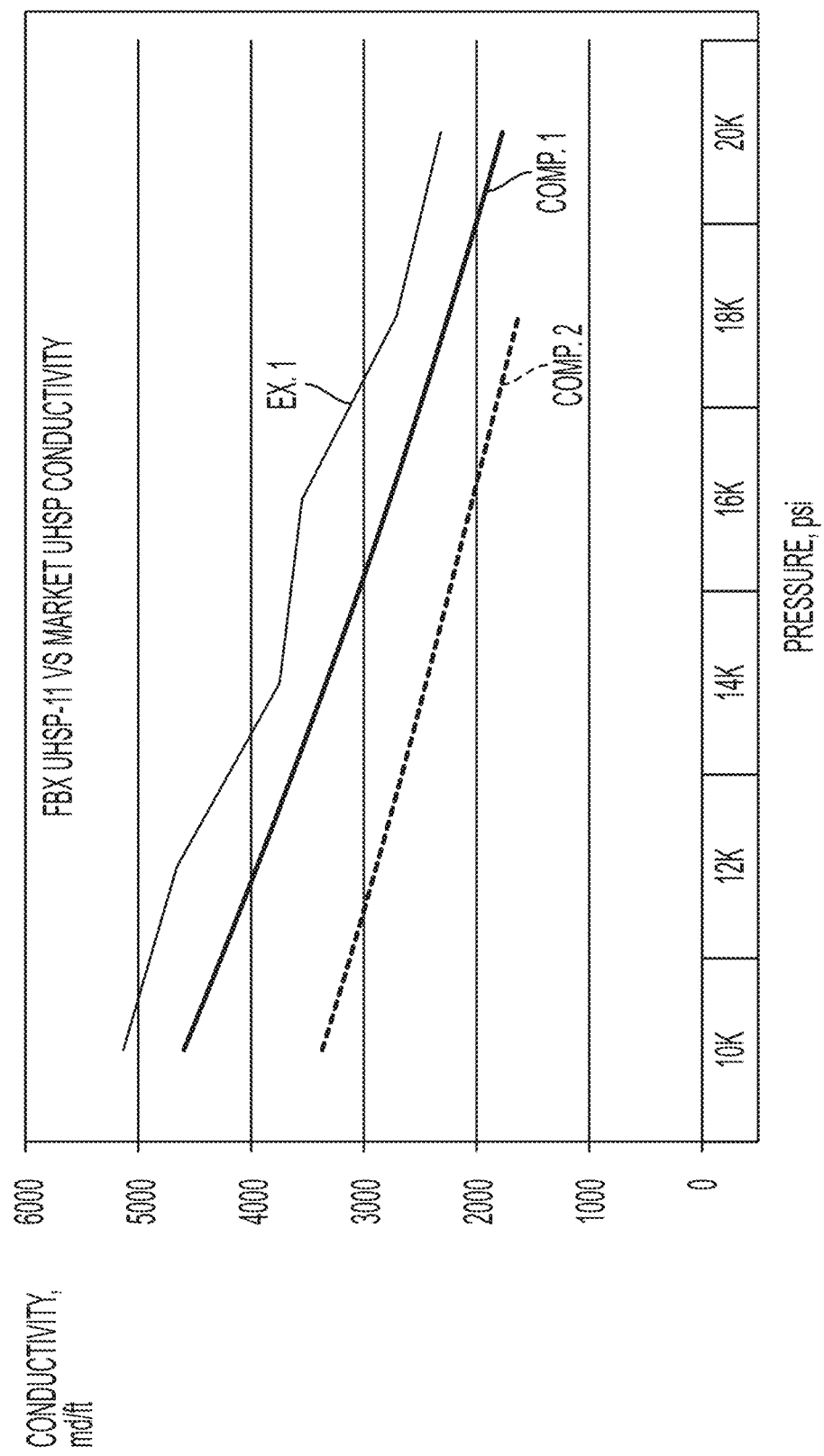
FIG. 5 is a graph depicting conductivity versus closure stress data of Example 1.

Conductivity tests were performed according to API RP 61 (1$^{st}$ Revision, Oct. 1, 1989) using an API conductivity cell stainless steel inserts. Each sample was loaded into the cell and closure stress applied to the particulate material using a hydraulic press. The results in and/ft are shown in Table V below and are further graphically set forth in FIG. 5:

TABLE V

| | 10K | 12K | 14K | 16K | 18K | 20K |
|---|---|---|---|---|---|---|
| Ex. 1 | 5,159 | 4,674 | 3,779 | 3,573 | 2,728 | 2,344 |
| Comp. 1 | 3,400 | 2,900 | 2,475 | 2,050 | 1,650 | |
| Comp. 1 | 4,640 | 4,000 | 3,370 | 2,800 | 2,300 | 1,795 |

While exemplary embodiments of the disclosure have been shown and described, many variations, modifications and/or changes of the system, methods of the present disclosure, such as in the components are possible and within the scope of the appended claims, and may be made and used by one of ordinary skill in the art without departing from the spirit or teachings of the disclosure and scope of appended claims.

Embodiment 1

A proppant sintered from a mixture comprising:
(a) between from about 80 to about 99 wt. percent of raw bauxite having an alumina tri-hydrate content greater than 59 wt. % or calcined bauxite having an aluminum oxide content greater than 80 wt. %;
(b) between from about 0 to about 10 wt. manganese powder; and
(c) between from about 0 to about 10 wt. percent milled raw dolomite.

Embodiment 2

A proppant sintered from a mixture comprising:
(a) between from about 50 to about 90 wt. % of calcined bauxite having an alumina tri-hydrate content greater than 59 wt. % and having an aluminum oxide content greater than 80 wt. %;
(b) between from about 0 to about 10 wt. manganese powder; and
(c) between from about 0 to about 10 wt. percent milled raw dolomite.

Embodiment 3

A proppant sintered from a mixture comprising:
(a) between 0 and about 50 wt. percent of raw bauxite having an alumina tri-hydrate content greater than 59 wt. %;
(b) between from about 50 to 90 wt. percent of calcined bauxite having an alumina tri-hydrate content greater than 80 wt. %, the calcined bauxite produced by calcining raw bauxite having an alumina tri-hydrate content greater than 59 wt. % and wherein the amount of aluminum oxide in the proppant is greater than 80 wt. %; (c) between 0 and about 10 wt. percent manganese powder; and (d) between 0 and about 10 wt. percent milled raw dolomite.

Embodiment 4

The proppant of any of embodiments 1 to 3, wherein the amount of aluminum oxide in the proppant is greater than 89 wt. %.

Embodiment 5

The proppant of embodiment 3 or 4, wherein the bauxite ore of the calcined bauxite is the same bauxite ore as the raw bauxite.

Embodiment 6

The proppant of any of embodiments 1 to 5, wherein the mixture further comprises between from about 1 to about 10 wt. percent binder.

Embodiment 7

The proppant of any of embodiments 1 to 6, wherein the raw bauxite has an alumina tri-hydrate content between 59 and 63 wt. percent.

Embodiment 8

The proppant of any of embodiments 1 to 7, wherein the raw bauxite contains less than about 0.5% alkali and alkaline earth oxides.

Embodiment 9

The proppant of any of embodiments 1 to 8, wherein the raw bauxite further comprises:
(a) between from about 1.5 to about 4.5 wt. percent titania;
(b) between from about 1.5 to about 4.5 wt. percent silica;
(c) between from about 0.4 to about 1.5 wt. percent iron oxide; and
(d) less than 0.5 wt. percent of alkali and alkaline metal.

Embodiment 10

The proppant of any of embodiments 1 to 9, wherein the proppant comprises less than 1.5% iron oxide, less than 0.5% alkali and more than 80 wt. % aluminum oxide.

Embodiment 11

The proppant of any of embodiments 1 to 10, wherein the proppant contains less than about 1 wt. % iron oxide.

Embodiment 12

The proppant of any of embodiments 1 to 11, wherein the proppant has an aluminum oxide content from about 85 to about 95 weight percent.

Embodiment 13

The proppant of any of embodiments 1 to 11, wherein the proppant has an aluminum oxide content in excess of 89 wt. %.

Embodiment 14

The proppant of any of embodiments 1 to 13, wherein the manganese is an ore or refined MnO, $MnO_2$, $Mn_3O_4$, a manganese salt or a mixture thereof.

Embodiment 15

The proppant of any of embodiments 1 to 14, wherein the raw bauxite is a Bonasika deposit ore.

Embodiment 16

A proppant prepared by:
(a) milling raw bauxite having an alumina tri-hydrate content greater than 59 wt. % to a particle size between from about minus 180 mesh to about minus 425 mesh;
(b) mixing the product of step (a) with manganese and dolomite to form a powder mixture, wherein the amount of the raw bauxite in the powder mixture is between from about 80 to about 90 weight percent;
(c) forming spheres from the powder mixture of step (b);
(d) sintering the spheres at a temperature between from about 1200° C. to about 1600° C.; and
(e) screening the sintered spheres.

Embodiment 17

The proppant of embodiment 16, wherein prior to step (a), the raw bauxite is dried to remove free water.

Embodiment 18

A proppant prepared by:
(a) calcining bauxite having an alumina tri-hydrate content greater than 59 wt. %;
(b) milling the calcined bauxite to a particle size between from about minus 180 mesh to about minus 425 mesh;
(c) mixing the product of step (b) with manganese and dolomite to form a powder mixture,
(d) forming spheres from the powder mixture of step (c);
(e) sintering the spheres at a temperature between from about 1200° C. to about 1600° C.; and
(f) screening the sintered spheres.

Embodiment 19

The proppant of embodiment 18, wherein the amount of the calcined bauxite in the powder mixture of step (c) is between from about 80 to about 90 weight percent.

Embodiment 20

The proppant of embodiment 18, wherein prior to step (b), raw bauxite is mixed with the calcined bauxite and further wherein step (c) comprises milling the raw bauxite with the calcined bauxite to produce a mixture of raw bauxite and calcined bauxite having a particle size between from about minus 180 mesh to about minus 425 mesh.

Embodiment 21

The proppant of embodiment 20, wherein the amount of raw bauxite in the mixture subjected to milling in step (c) is between 0 and 50 wt. percent and the amount of calcined bauxite is between from about 50 to 90 wt. percent.

Embodiment 22

The proppant of any of embodiments 18 to 21, wherein prior to calcining the bauxite, the bauxite is dried to remove free water.

Embodiment 23

The proppant of any of embodiments 18 to 21, wherein the bauxite of the calcined bauxite is raw bauxite which is calcined without drying.

Embodiment 24

The proppant of any of embodiments 20 to 23, wherein the mixture of calcined bauxite and raw bauxite contains from about 80 to about 99 wt. percent of raw bauxite.

Embodiment 25

A process of preparing a proppant comprising:
 (a) milling a direct feed bauxite having an alumina tri-hydrate content greater than 59 wt. % to a particle size between from about minus 180 mesh to about minus 425 mesh;
 (b) mixing the product of step (a) with manganese and dolomite to form a powder mixture, wherein the amount of the direct feed bauxite in the powder mixture is between from about 80 to about 90 weight percent;
 (c) forming spheres from the powder mixture of step (b);
 (d) sintering the spheres at a temperature between from about 1200° C. to about 1600° C.; and
 (e) screening the sintered spheres.

Embodiment 26

The process of embodiment 25, wherein prior to step (a), the direct feed bauxite is dried to remove free water.

Embodiment 27

A process of preparing a proppant comprising:
 (a) calcining bauxite having an alumina tri-hydrate content greater than 59 wt. %;
 (b) milling the calcined bauxite to a particle size between from about minus 180 mesh to about minus 425 mesh;
 (c) mixing the product of step (b) with manganese and dolomite to form a powder mixture,
 (d) forming spheres from the powder mixture of step (c);
 (e) sintering the spheres at a temperature between from about 1200° C. to about 1600° C.; and
 (f) screening the sintered spheres.

Embodiment 28

The process of embodiment 27, wherein the amount of the calcined bauxite in the powder mixture of step (c) is between from about 80 to about 90 weight percent.

Embodiment 29

The process of embodiment 28, wherein prior to step (b), raw bauxite is mixed with the calcined bauxite and further wherein step (c) comprises milling the raw bauxite with the calcined bauxite to produce a mixture of raw bauxite and calcined bauxite having a particle size between from about minus 180 mesh to about minus 425 mesh.

Embodiment 30

The process of embodiment 29, wherein prior to step (a), the raw bauxite is dried to remove free water.

Embodiment 31

The process of embodiment 29, wherein the amount of raw bauxite in the mixture subjected to milling in step (b) is between 0 and 50 wt. percent and the amount of calcined bauxite is between from about 50 to 90 wt. percent.

Embodiment 32

The process of any of embodiments 29 to 31, wherein the calcined bauxite is prepared by calcining the same bauxite ore as the bauxite ore of the raw bauxite.

Embodiment 33

The process of any of embodiments 29 to 32, wherein the mixture subjected to sintering comprises between 0 and about 50 wt. % raw bauxite, between from about 50 to about 90 wt. % calcined bauxite, between 0 and about 10 wt. percent manganese and between 0 and about 10 wt. % dolomite.

Embodiment 34

A process of making a proppant comprising:
 (a) calcining a first raw bauxite having an alumina trihydrate content greater than about 60 weight percent;
 (b) mixing the calcined bauxite of step (a) and a second raw bauxite having an alumina content greater than about 60 weight percent, wherein the amount of calcined bauxite in the mixture of calcined bauxite and second raw bauxite is between from about 80 to about 90 weight percent;
 (c) milling the mixture of step (b) to form a powder of the raw second direct feed bauxite and calcined bauxite;
 (d) adding flux components to the powder mixture of the raw bauxite and the calcined bauxite and forming a sphere, the sphere comprising the flux, the raw bauxite and the calcined bauxite; wherein the flux comprises manganese powder and dolomite; and then either
 (i) drying at least one of said sphere to remove water to form a dried sphere; screening said dried sphere; and sintering said dried sphere to form a sintered proppant; and, optionally, polishing said sintered sphere; or
 (ii) screening said sphere, drying said screened sphere, and sintering said screened dried sphere to form a sintered proppant sphere; and optionally polishing said sintered proppant sphere.

Embodiment 35

The process of embodiment 34 wherein the first raw bauxite and the second raw bauxite are the same.

Embodiment 36

The process of embodiment 34 or 35, wherein the sintered proppant sphere of step d(i) or step d(ii) contains:
 (a) between from about 5 to about 10 wt. percent of the second raw bauxite;
 (b) between from about 80 to 90 wt. percent of calcined bauxite;
 (c) between from about 4 to about 10 wt. manganese powder; and
 (d) between from about 1 to about 4 wt. percent milled raw dolomite.

Embodiment 37

The process of any of embodiments 34 to 36, wherein the mixture further comprises between from about 1 to about 10 wt. percent binder.

Embodiment 38

The process of any of embodiments 34 to 37, wherein the raw bauxite contains less than about 0.5% alkali and alkaline earth oxides.

Embodiment 39

The process of any of embodiments 34 to 38, wherein the raw bauxite further comprises:

(a) between from about 0.4 to about 1.5 wt. percent iron oxide; and
(b) less than 0.5 wt. percent of alkali and alkaline metal content.

Embodiment 40

The process of any of embodiments 29 to 39, wherein the raw bauxite further comprises:
(a) between from about 1.5 to about 4.5 wt. percent titania; and
(b) between from about 1.5 to about 4.5 wt. percent silica;

Embodiment 41

The process of any of embodiments 29 to 40, wherein the mixture subjected to sintering comprising between 0 to about 100 wt. % calcined bauxite, between from about 50 to about 90 wt. % raw bauxite, from about 0 to about 10 wt. percent manganese and from about 0 to about 10 wt. % dolomite.

Embodiment 42

The process of any of embodiments 29 to 41, wherein the manganese is MnO, $MnO_2$, $Mn_3O_4$, a manganese salt or a mixture thereof.

Embodiment 43

The process of any of embodiments 29 to 42, wherein the raw bauxite is a bauxite mineral deposit extracted after the removal of overburden.

Embodiment 44

The process of any of embodiments 29 to 43, wherein the raw bauxite is a Bonasika deposit ore.

Embodiment 45

The process of embodiment 44, wherein the raw bauxite is a Bonasika 6 or Bonasika 7 deposit ore or a mixture thereof.

What is claimed is:

1. A spherical proppant comprising less than 1.5 wt. percent iron oxide and having an aluminum oxide content from 80 to 95 weight percent and sintered from a mixture comprising:
   (a) between from about 5 to about 50 weight percent of a titania containing raw bauxite having an alumina trihydrate content greater than 59 weight percent;
   (b) between from about 50 to about 90 weight percent of calcined bauxite having an aluminum oxide content greater than 80 weight percent;
   (c) manganese; and
   (d) dolomite
wherein the bauxite calcined to form the calcined bauxite is the same bauxite as the raw bauxite and further wherein the spherical proppant exhibits a crush resistance, API RP 56, less than 3.5 percent fines at 15,000 psi.

2. The proppant of claim 1, wherein the amount of titania in the raw bauxite is from about 1.5 to about 4.5 weight percent.

3. The proppant of claim 1, wherein the aluminum oxide content of the calcined bauxite is between from 80 to 95 weight percent.

4. The proppant of claim 1, wherein the mixture comprises from 5 to 10 weight percent of the raw bauxite and from 80 to 90 weight percent of the calcined bauxite.

5. The proppant of claim 1, wherein the amount of silica in the raw bauxite is between from about 1.5 to about 4.5 weight percent.

6. The proppant of claim 1, wherein the amount of iron oxide in the spherical proppant is less than about 1 percent.

7. The proppant of claim 1, wherein the spherical proppant exhibits a crush resistance, API RP 56, less than or equal to 10.5 percent fines at 30,000 psi.

8. The proppant of claim 1, wherein the spherical proppant exhibits a crush resistance, API RP 56, less than or equal to 7 percent at 20,000 psi.

9. The proppant of claim 3, wherein the aluminum oxide content of the calcined bauxite is between from 80 to 90 weight percent.

10. The proppant of claim 1, wherein the mixture further comprises between 1 to 10 weight percent of binder.

11. The proppant of claim 10, wherein the binder is selected from the group consisting of polyvinyl alcohol, lignin sulphonate, corn starch, wheat starch, bentonite, clay and a clay-like material.

12. The proppant of claim 1, wherein the particle size of the raw bauxite is between from minus 180 mesh to minus 425 mesh.

* * * * *